United States Patent
Van De Sluis et al.

(10) Patent No.: US 12,026,803 B2
(45) Date of Patent: Jul. 2, 2024

(54) RENDERING IMAGES STORED WITH GROW PROTOCOL ALONG WITH CONDITIONS PER GROWTH STAGE

(71) Applicant: SIGNIFY HOLDING B.V., Eindhoven (NL)

(72) Inventors: Bartel Marinus Van De Sluis, Eindhoven (NL); Rob Franciscus Maria Van Elmpt, Roermond (NL); Marcellinus Petrus Carolus Michael Krijn, Eindhoven (NL); Judith Hendrika Maria De Fries, Budel-School (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/640,037

(22) PCT Filed: Sep. 8, 2020

(86) PCT No.: PCT/EP2020/074994
§ 371 (c)(1),
(2) Date: Mar. 3, 2022

(87) PCT Pub. No.: WO2021/048076
PCT Pub. Date: Mar. 18, 2021

(65) Prior Publication Data
US 2022/0343558 A1    Oct. 27, 2022

(30) Foreign Application Priority Data
Sep. 10, 2019 (EP) .................... 19196305

(51) Int. Cl.
*G06T 1/00* (2006.01)
*G06T 11/00* (2006.01)
(Continued)

(52) U.S. Cl.
CPC ............ *G06T 11/00* (2013.01); *G06T 1/0007* (2013.01); *G06V 10/761* (2022.01); *H04N 23/60* (2023.01);
(Continued)

(58) Field of Classification Search
None
See application file for complete search history.

(56) References Cited

U.S. PATENT DOCUMENTS 10,034,358 B1    7/2018  Chen
2007/0098379 A1*  5/2007  Wang .................. H04N 19/105
                                                    396/14
(Continued)

FOREIGN PATENT DOCUMENTS

WO    2019049048 A1    3/2019

*Primary Examiner* — Kyle Zhai

(57) ABSTRACT

A system is configured to obtain multiple images (83) of a plant and store a plurality of the multiple images of the plant with a grow protocol (71) for growing the plant. Each of the images is associated with a different capture moment. The system is further configured to select the grow protocol separately from the plant and render the plurality of images upon selection of the grow protocol. Each of the images is rendered along with one or more desired and/or measured conditions (74-76) of a growth stage (84). The growth stage corresponds to a capture moment of the respective image. The grow protocol comprises a plurality of growth stages and the one or more desired and/or measured conditions are included in the grow protocol.

19 Claims, 5 Drawing Sheets

(51) Int. Cl.
*G06V 10/74* (2022.01)
*H04N 23/60* (2023.01)
(52) U.S. Cl.
CPC .................. *G06T 2200/24* (2013.01); *G06T 2207/30188* (2013.01)

(56) References Cited

U.S. PATENT DOCUMENTS

| | | | |
|---|---|---|---|
| 2013/0198693 A1* | 8/2013 | Jost | A01H 1/04 715/848 |
| 2014/0176705 A1* | 6/2014 | Ibamoto | H04N 23/661 348/135 |
| 2015/0342125 A1 | 12/2015 | Krijn et al. | |
| 2016/0113213 A1 | 4/2016 | Berinsky | |
| 2018/0359931 A1 | 12/2018 | Millar | |
| 2019/0066234 A1* | 2/2019 | Bedoya | A01B 79/005 |

\* cited by examiner

RENDERING IMAGES STORED WITH GROW PROTOCOL ALONG WITH CONDITIONS PER GROWTH STAGE

CROSS-REFERENCE TO PRIOR APPLICATIONS

This application is the U.S. National Phase application under 35 U.S.C. § 371 of International Application No. PCT/EP2020/074994, filed on Sep. 8, 2020, which claims the benefit of European Patent Application No. 19196305.7, filed on Sep. 10, 2019. These applications are hereby incorporated by reference herein.

FIELD OF THE INVENTION

The invention relates to a system for obtaining images of a plant.

The invention further relates to a method of obtaining images of a plant.

The invention also relates to a computer program product enabling a computer system to perform such a method.

BACKGROUND OF THE INVENTION

Horticulture systems, e.g. horticulture lighting systems, are becoming more and more advanced. If cameras are integrated into a horticulture system, images can be captured frequently during various growth stages of the plant or for the duration of an applied grow recipe.

For example, US2018/0359931 A1 discloses an image capture system for a grow pod which includes a master controller that has a processor, a memory, and cameras that are communicatively coupled to the master controller and positioned to capture images of plants or seeds. A grow recipe defines instructions for growing the plants or seeds and expected attributes corresponding to the instructions. The master controller receives, from the cameras, the images of the plants or seeds, determines attributes of the plants or seeds from the images, compares the attributes of the plants or seeds from the images to the expected attributes defined by the grow recipe, and adjusts the instructions of the grow recipe for growing the plants or seeds based on the comparison of the attributes to the expected attributes.

This horticulture system allows growers to control the growth of their plants automatically. However, a grower typically has to choose from many grow recipes for the same plant species and this horticulture system does not help growers choose a grow recipe.

SUMMARY OF THE INVENTION

It is a first object of the invention to provide a system for managing the growth of plants, which has improved human-machine interaction to help growers choose a grow recipe.

It is a second object of the invention to provide a method, which improves human-machine interaction in a system for managing the growth of plants to help growers choose a grow recipe.

In a first aspect of the invention, a system for obtaining images of a plant comprises at least one input interface, at least one output interface, and at least one processor configured to use said at least one input interface to obtain multiple images of a plant, each of said images being associated with a different capture moment, store a plurality of said multiple images of said plant with a grow protocol for growing said plant, select said grow protocol separately from said plant, and use said at least one output interface to render said plurality of images upon selection of said grow protocol, each of said plurality of images being rendered along with one or more desired and/or measured conditions of a growth stage, said growth stage corresponding to a capture moment of said respective image and said grow protocol comprising a plurality of growth stages and said one or more desired and/or measured conditions being included in said grow protocol.

The representative images stored with the grow protocol (also referred to as grow recipe) help growers see what results can be expected when the grow protocol is applied to a given plant species or a given plant variety within a given plant species. By timing the rendering of the plant images to coincide with the corresponding desired and/or measured conditions, the grower is able to get a better idea of how the desired and/or measured conditions impact the growth of the given plant species. Images of an individual plant are stored with the grow protocol for the plant species to make this possible.

Thus, captured images are used to augment a (pre-stored) grow protocol with representative images of a plant at different growth stages or even different moments in a growth stage. A graphical user interface shows a time-scale representation of the grow protocol using the plant images. Each growth stage may be a day, for example. Said one or more desired and/or measured conditions may comprise lighting conditions and/or climate conditions and/or nutrition conditions, for example. The plant may be a flowering plant, i.e. a plant that produces flowers to reproduce, or a non-flowering plant, for example.

Said at least one processor may be configured to render said plurality of images as a video sequence, said images being in order of elapsed growth time in said video sequence. By creating such a time-lapse, a grower may be able to get a visual overview of all growth stages of the grow protocol without much effort.

Said at least one processor may be configured to use said at least one input interface to receive user input comprising a user command for navigating through said growth stages and select one or more images to be rendered next from said plurality of images based on said user command. This may help a grower to explore and study particular growth stages of the grow protocol more easily.

Said at least one processor may be configured to select a representative subset of said multiple obtained images as said plurality of images before storing said plurality of images of said plant with said grow protocol. If a camera automatically provides images at a high rate, then it is often not beneficial to store all these images and it is then beneficial to select a representative subset.

Said at least one processor may be configured to use said at least one input interface to receive user input, said user input identifying a further plant and said grow protocol, obtain images of said identified further plant, determine differences between said obtained images and a plurality of images stored with said identified grow protocol, and use said at least one output interface to provide an alert if said differences are determined to exceed a predetermined threshold. Thus, images captured in real-time may be compared with representative images stored with the grow protocol. This allows a grower to select an individual plant and get an alert if the growth of the individual plant is not as expected considering the representative images stored with the grow protocol.

Said at least one processor may be configured to use said at least one output interface to transmit a capturing schedule for capturing said images of said identified further plant to one or more cameras. This may be used to prevent that images are transmitted which are not used. For example, the capturing schedule may specify that an image is taken and transmitted every day.

Said at least one processor may be configured to use said at least one input interface to receive user input, said user input comprising a camera or location identifier and information for identifying said grow protocol, store said camera or location identifier with said grow protocol, use said at least one input interface to obtain a collection of images of a plurality of plants, said collection comprising said multiple images, select said plurality of images from said collection of images based on said camera or location identifiers, and store said plurality of images of said plant with said grow protocol. Images of different individual plants may be received and then stored with different grow protocols. By storing a camera or location identifier in the grow protocol, it is easy to determine in which grow protocol a received image should be stored, i.e. by finding the grow protocol that has been associated with the camera or location identifier that was included in an image or transmitted along with the image.

Said at least one processor may be configured to use said at least one output interface to transmit a capturing schedule for capturing said multiple images to said one or more cameras. This may be used to prevent that images are transmitted which will not be stored with the growth recipe and not be used otherwise. For example, the capturing schedule may specify that an image is taken and transmitted every day.

Said at least one processor may be configured to use said at least one output interface to control one or more cameras to capture said multiple images at said different capture moments. This is beneficial, for example, if a camera is not able to use a capturing schedule, but its capturing function can be controlled remotely.

Said at least one processor may be configured to use said at least one input interface to obtain a current position of said plant with respect to said one or more cameras and use said at least one output interface to control said one or more cameras to capture one of said images at a moment which depends on said current position. If individual plants are moving on a conveyor belt or in a mobile gutter system, or moving as part of a collection of plants in a moving tray, e.g. in a vertical farm, and images of a certain individual plant are captured in order to store them in the grow protocol of a certain plant species, the images need to be captured at moments when the certain individual plant is in front of a camera.

Said one or more cameras may comprise a plurality of cameras and said at least one processor may be configured to select one of said plurality of cameras based on said current position. This is beneficial, for example, if a camera is not able to use a capturing schedule, but its capturing function can be controlled remotely. This may be used to follow a certain individual plant that is moving on a conveyor belt, e.g. in a vertical farm.

In a second aspect of the invention, a method of obtaining images of a plant comprises obtaining multiple images of a plant, each of said images being associated with a different capture moment, storing a plurality of said multiple images of said plant with a grow protocol for growing said plant, selecting said grow protocol separately from said plant, and rendering said plurality of images upon selection of said grow protocol, each of said plurality of images being rendered along with one or more desired and/or measured conditions of a growth stage, said growth stage corresponding to a capture moment of said respective image and said grow protocol comprising a plurality of growth stages and said one or more desired and/or measured conditions being included in said grow protocol. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for obtaining images of a plant.

The executable operations comprise obtaining multiple images of a plant, each of said images being associated with a different capture moment, storing a plurality of said multiple images of said plant with a grow protocol for growing said plant, selecting said grow protocol separately from said plant, and rendering said plurality of images upon selection of said grow protocol, each of said plurality of images being rendered along with one or more desired and/or measured conditions of a growth stage, said growth stage corresponding to a capture moment of said respective image and said grow protocol comprising a plurality of growth stages and said one or more desired and/or measured conditions being included in said grow protocol.

The executable operations further comprise determining a sensor coverage area of said plurality of presence sensor devices, including gaps in said sensor coverage area, based on said sensor locations, said sensor orientations and said sensor fields of view, determining one or more parameters for presence detection based on said gaps in said sensor coverage area, and outputting said one or more parameters or a presence detection result which has been determined using said one or more parameters As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
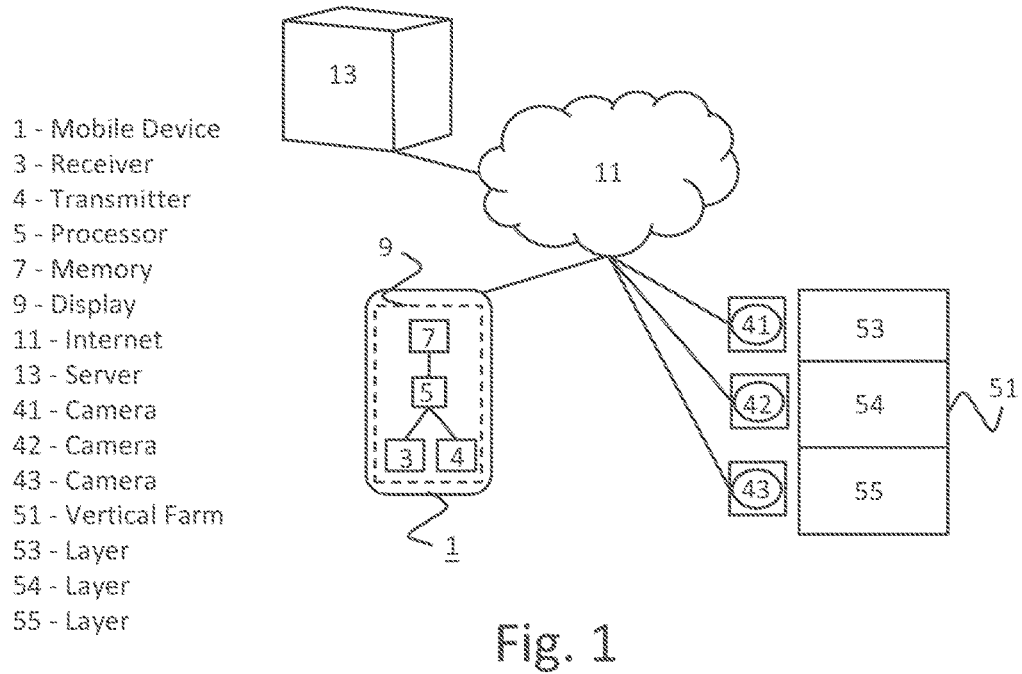
FIG. 1 is a block diagram of a first embodiment of the system.

FIG. 1 shows a first embodiment of the system for obtaining images of a plant. In the example of FIG. 1, plants are grown in a vertical farm 51 with three layers 53-55 and images of the plants are captured using cameras 41-43. Each of layers 53-55 typically comprises multiple segments (not shown). In the embodiment of FIG. 1, the system is a mobile device 1. The mobile device 1 is connected to the Internet 11, e.g. via a wireless LAN access point or a cellular communication network. An Internet server 13 is also connected to the Internet 11.

The mobile device 1 comprises a receiver 3, a transmitter 4, a processor 5, memory 7, and a display 9. The processor 5 is configured to use the receiver 3 to obtain multiple images of a plant and store a plurality of the multiple images of the plant with a grow protocol (also referred to as a grow recipe) for growing the plant, e.g. on storage means 7 or on Internet server 13. Each of the images is associated with a different capture moment.

The cameras 41-43 may be in control of the capturing and storing of images. For example, they may retrieve a grow protocol identifier and identifier of the current growth stage and store the images in this grow protocol along with these identifiers. Alternatively, the cameras 41-43 may receive grow protocol activation commands from the mobile device 1 or a horticulture system (not shown), for example. For instance, the cameras 41-43 may detect control commands indicating the activation of a grow protocol. Based on the properties of the grow protocol, the cameras 41-43 may determine or retrieve a corresponding image capturing schedule (e.g. pre-defined time intervals for the duration of the protocol). The horticulture system may control one or more of the lighting, the climate and the nutrition-dispensing.

The processor 5 is further configured to select the grow protocol separately from the plant and use the display 9 to render the plurality of images upon selection of the grow protocol. The grow protocol may be selected directly or via a different plant to which the grow protocol is applied, for example. Each of the plurality of images is rendered along with one or more desired and/or measured conditions of a growth stage. This growth stage corresponds to a capture moment of the respective image. The grow protocol, also referred to as grow recipe, comprises a plurality of growth stages and the one or more desired and/or measured conditions being included in the grow protocol.

The one or more desired and/or measured conditions typically comprise lighting conditions and/or climate conditions and/or nutrition conditions. Nutrition normally comprises fertilization and water. A light recipe typically comprises thresholds, daylight measurements and/or control parameters, supplemental light levels, and supplemental light spectra. A plant typically needs 5 to 10 hours of darkness/sleep. Growth of a plant preferably takes place during daylight, as artificial light is relatively expensive. Each growth stage is typically a period during which the grow protocol/recipe stays the same (e.g. the same light schedule, irrigation schedule, plant density). Each growth stage may, for example, have a duration of one day, but alternatively, each growth stage may have a different duration than one day, and different growth stages might even have different durations.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with an access point to the Internet 11, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the system is a mobile device. In an alternative embodiment, the system of the invention is a different device, e.g. a computer. In the embodiment of FIG. 1, the system of the invention comprises a single device. In an alternative embodiment, the system of the invention comprises a plurality of devices.

Figure 2:
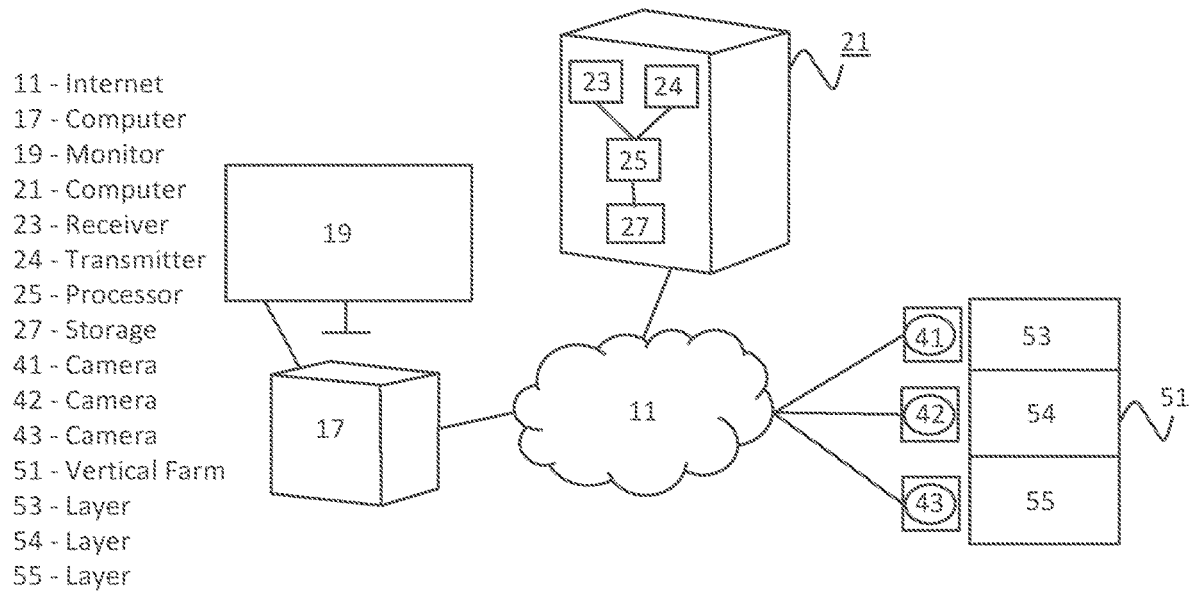
FIG. 2 is a block diagram of a second embodiment of the system.

FIG. 2 shows a second embodiment of the system for obtaining images of a plant. In the embodiment of FIG. 2, the system is a computer 21. The computer 21 is connected to the Internet 11 and acts as a server. The computer 21 comprises a receiver 23, a transmitter 24, a processor 25, and storage means 27. The processor 25 is configured to use the receiver 23 to obtain multiple images of a plant from the cameras 41-43 and store a plurality of the multiple images of the plant with a grow protocol for growing the plant, e.g. on storage means 27. Each of the images is associated with a different capture moment.

The processor 25 is further configured to select the grow protocol separately from the plant and use the transmitter 24 to render the plurality of images upon selection of the grow protocol via a personal computer 17 and thereto connected monitor 19, e.g. via a web/html interface. Each of the plurality of images is rendered along with one or more desired and/or measured conditions of a growth stage. This growth stage corresponds to a capture moment of the respective image. The grow protocol comprises a plurality of growth stages and the one or more desired and/or measured conditions are included in the grow protocol. In the embodiment of FIG. 2, the synchronization between the rendering of the desired and/or measured conditions and the rendering of the images is performed by the processor 25.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with an access point to the Internet 11, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector and a display. The invention may be implemented using a computer program running on one or more processors.

The method of the invention typically involves capturing multiple images of a plant over time, associating them with their corresponding growth stages and combining them to render a grow protocol representation on a display. The resulting representation is used to represent individual grow protocols in a large grow protocol database. Thus, images captured during an active grow protocol are used to represent individual grow protocols in a database. Those representative images could help growers to see what results can be expected when the grow protocol is applied to a given plant species.

Possibly, intelligence or algorithms are used to select the images which are most representative for the grow protocol. A time-lapse recording of a growing plant may be rendered using the multiple captured images to represent the grow protocol, i.e. the plurality of images is rendered as a video sequence in which the images are rendered in order of elapsed growth time. However, it is also possible to render a timeline representation representing the current grow protocol stage enriched with an image representative of the current grow protocol state and enabling the user to scroll through images representative of earlier growth stages, as shown in FIG. 3.

Figure 3:
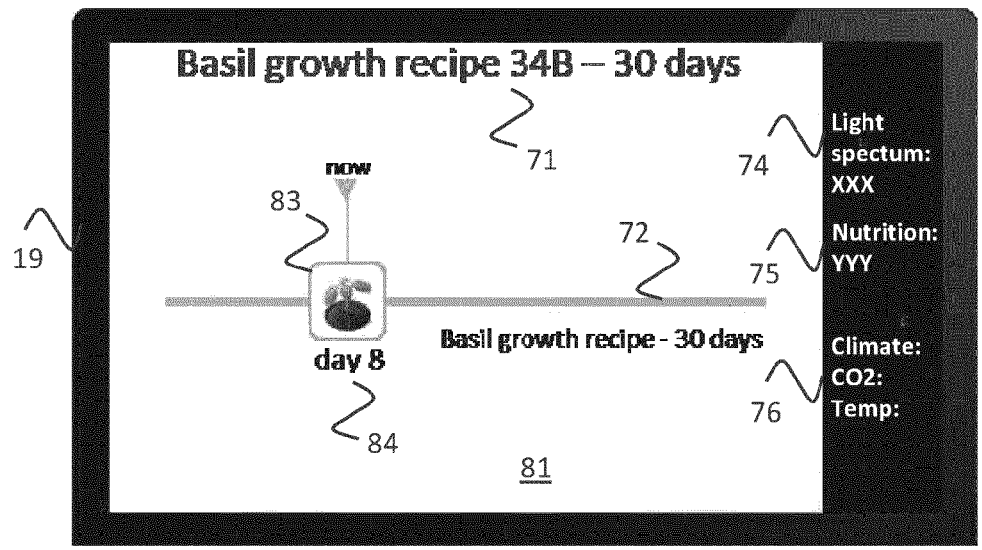
FIG. 3 shows a first screen of an example user interface for managing the growth of plants.

In the first screen 81 of the user interface, which is shown in FIG. 3, a grow protocol timeline 72 is annotated with an image 83 representing the current plant state. The user interface is rendered on a display 19. Desired and/or measured conditions 74-76 are shown at the right side of the user interface and comprise light (spectrum) conditions 74, nutrition conditions 75 and climate conditions 76. In the example of FIG. 3. The climate conditions 76 comprise CO2 and temperature conditions.

In the example of FIG. 3, the user has selected a certain individual plant, or a certain group of individual plants in the same growth stage, and the user is now viewing the representation of the activated grow protocol, as identified by label 71. The image 83 has been stored in the grow protocol and is normally a photograph of a plant that was grown in the past. The image 83 is rendered with a label 84 ("day 8") of the growth stage that corresponds to the capture moment of the image 83, which is the current growth stage of the selected individual plant in FIG. 3.

Figure 4:
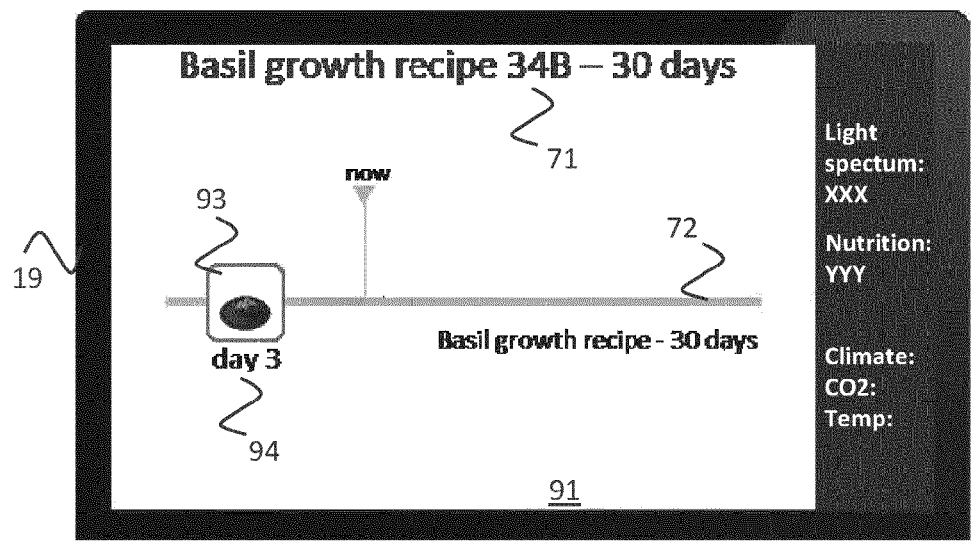
FIG. 4 shows a second screen of the example user interface of FIG. 3.

It is also possible for a user to scroll back in time to see earlier growth states. This is shown in FIG. 4, which depicts a second screen 91 of the user interface of FIG. 3. An image 93 is rendered with a label 94 ("day 3") of the growth stage that corresponds to the capture moment of the image 93. In the example of FIG. 4, the image 93 is a photograph of the same plant as the image 83 of FIG. 3, normally a representative plant that was grown in the past. The desired and/or measured conditions 74-76 are updated accordingly, but this is not shown in FIGS. 3 and 4.

Thus, the system that renders the user interface of FIGS. 3 and 4 receives user input that comprises a user command for navigating through the growth stages and selects one or more images to be rendered next from the plurality of images based on the user command. Alternatively, the user may be able to scroll back in time to check what the appearance of a selected individual plant was one or more days ago.

Not only images of the current and previous growth stages may be displayed, but it may be made possible to move the slider to the future, as the rendered images are normally of a plant that was grown in the past.

Figure 5:
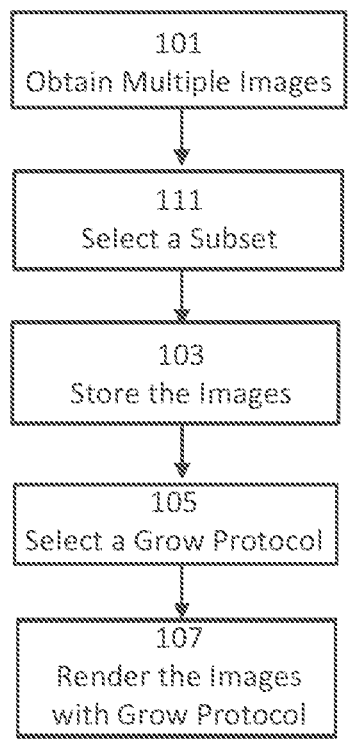
FIG. 5 is a flow diagram of a first embodiment of the method.

A first embodiment of the method of obtaining images of a plant is shown in FIG. 5. A step 101 comprises obtaining multiple images of a plant. Each of the images is associated with a different capture moment. A step 111 comprises selecting a representative subset of the multiple obtained images, e.g. by selecting an image captured at noon each day or by using a more complex algorithm. A step 103 comprises storing the representative images selected in step 111 with the grow protocol for growing the plant.

A step 105 comprises selecting the grow protocol separately from the plant. A step 107 comprises rendering the plurality of images upon selection of the grow protocol. Each of the images is rendered along with one or more desired and/or measured conditions of a growth stage which corresponds to a capture moment of the respective image. The grow protocol comprises a plurality of growth stages and the one or more desired and/or measured conditions are included in the grow protocol.

Figure 6:
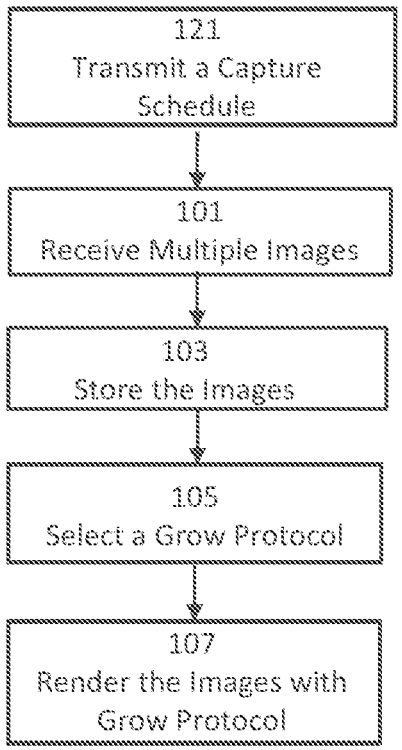
FIG. 6 is a flow diagram of a second embodiment of the method.

A second embodiment of the method of obtaining images of a plant is shown in FIG. 6. A step 121 comprises transmitting a capturing schedule for capturing multiple of a plant images to one or more cameras. Next, a step 101 comprises receiving the multiple images of the plant from the one or more cameras.

Since only the requested images are received in this embodiment, it is not necessary to select a representative subset and step 111 of FIG. 5 has been omitted. Step 111 can also be omitted in an alternative embodiment in which no capturing schedule is transmitted, but the one or more cameras are controlled to capture the multiple images at the different capture moments. After step 101, steps 103, 105 and 107 of FIG. 5 are performed.

Figure 7:
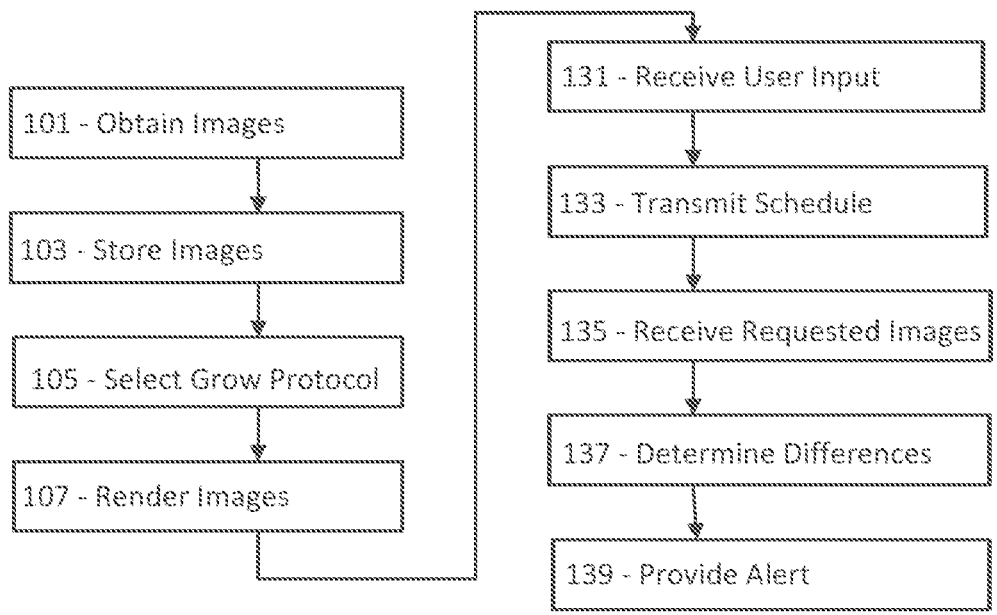
FIG. 7 is a flow diagram of a third embodiment of the method.

A third embodiment of the method of obtaining images of a plant is shown in FIG. 7. First, steps 101 to 107 are performed, see e.g. FIG. 5. Step 101 comprises obtaining multiple images of a plant. Step 103 comprises storing the obtained images with a grow protocol for growing the plant. Step 105 comprises selecting the grow protocol separately from the plant by selecting the plant species to which the grow protocol relates. Step 107 comprises rendering the plurality of images upon selection of the grow protocol, see FIG. 5.

Steps 131 to 139 are performed at a later time. Step 131 comprises receiving user input that identifies a further plant, i.e. an individual plant, and the grow protocol for this plant. In the embodiment of FIG. 7, a step 133 is performed next. Step 133 comprises transmitting a capturing schedule for capturing the images of the identified further plant to one or more cameras. In an alternative embodiment, these images are selected from a collection of received images or the one or more cameras are remotely controlled to capture images at certain moments.

A step 135 is performed after step 133. Step 135 comprises receiving the requested images of the identified further plant from the one or more cameras. A step 137 comprises determining differences between the obtained images and a plurality of images stored with the identified grow protocol. A step 139 comprises providing an alert if the differences are determined to exceed a predetermined threshold. For instance, the grower could receive an alert on a mobile or stationary display indicating that a growth deviation has been detected, including one or multiple captured images showing the recent or current state. Steps 137 and 139 may be implemented, for example, using a trained deep learning network, e.g. a neural network. For example, the deep learning network may determine based on two input images (of the plant and the further plant in the same growth stage) whether an alarm should be generated.

Figure 8:
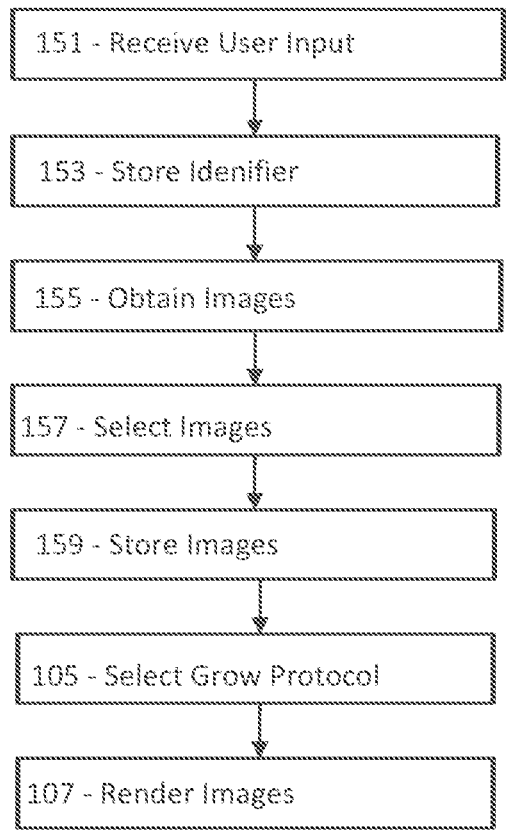
FIG. 8 is a flow diagram of a fourth embodiment of the method.

A fourth embodiment of the method of obtaining images of a plant is shown in FIG. 8. A step 151 comprises receiving user input that comprises a camera or location identifier and information for identifying a grow protocol. The grow protocol comprises a plurality of growth stages and the one or more desired and/or measured conditions are included in the grow protocol. In the embodiment of FIG. 8, the input is provided by a user. For example, when a grower activates a grow protocol for a new individual plant, he may be able to indicate that he wishes images of this plant to be captured and stored with the grow protocol. In an alternative embodiment, this input is provided by a system and this may be initiated based on a schedule or based on detecting the arrival of a specific type of plant or tray, for example.

A grow protocol typically comprises at least a lighting recipe and optionally further comprises a schedule of climate and nutrition conditions. The location identifier may indicate at which segment (or device) of the horticulture system the grow protocol is activated. Then, based on the location where the grow protocol is activated, co-located camera devices may be determined that are directed towards the plants grown under the grow protocol. In a possible implementation, camera devices are associated with one or more lighting devices.

It is also possible that the cameras are integrated as part of the grow lighting devices. Multiple camera identifiers and/or location identifiers may be associated with a grow protocol. This may be beneficial, because plants are typically replanted after a certain time, e.g. after germinating. A camera or location identifier may be associated with a certain growth stage or certain sequence of growth stages. A step 153 comprises storing the camera or location identifier with the grow protocol.

The camera(s) determined from the user input in step 151 is/are controlled to capture images of the plant(s) receiving the grow protocol. In one implementation, the horticulture system sends regular control commands to the determined camera(s). Instead of sending multiple camera control commands, the horticulture system might send a time schedule to the camera devices (e.g. upon activation of a grow protocol), specifying at what points in time images need to be captured. Alternatively, the camera may continuously or frequently (e.g. daily) take images.

A step 155 (which is somewhat similar to step 101 of FIGS. 5-7) comprises obtaining a collection of images of a plurality of plants. These images have been captured with the camera(s) determined from the user input in step 151. A step 157 comprises selecting the plurality of images from the collection of images based on the camera or location identifiers stored with the growth protocol.

A step 159 (which is somewhat similar to step 103 of FIGS. 5-7) comprises storing the plurality of images of the plant selected in step 157 with the grow protocol. The captured images may be stored at the camera device, the horticulture system, or the horticulture lighting system, for example. The images are stored in such a way that the corresponding grow protocol and the growth stage for each image can be determined.

This may be achieved by storing location and timestamp information for each image, for example. In an alternative implementation, each image may be annotated with data related to the active grow protocol such as its identifier or growth stage. In addition, it may be useful to store the camera identifier and/or camera location. The camera identifier helps to combine the images from one single camera in order to generate a time-based representation of the plant state over time, such as a time-lapse recording.

In FIG. 8, steps 157 and 159 are only performed for the grow protocol identified by the information received in step 151. However, typically, for each obtained image that is associated with a camera or location identifier, a grow protocol with this camera or location identifier would be searched and steps 157 and 159 would thus be performed for each matching grow protocol.

Step 105 comprises selecting the grow protocol separately from the plant. For example, a user selects the plant species to which the grow protocol relates and then chooses the grow protocol from a list of grow protocols. Step 107 comprises rendering the plurality of images upon selection of the grow protocol. Each of the images is rendered along with one or more desired and/or measured conditions of a growth stage which corresponds to a capture moment of the respective image.

Figure 9:
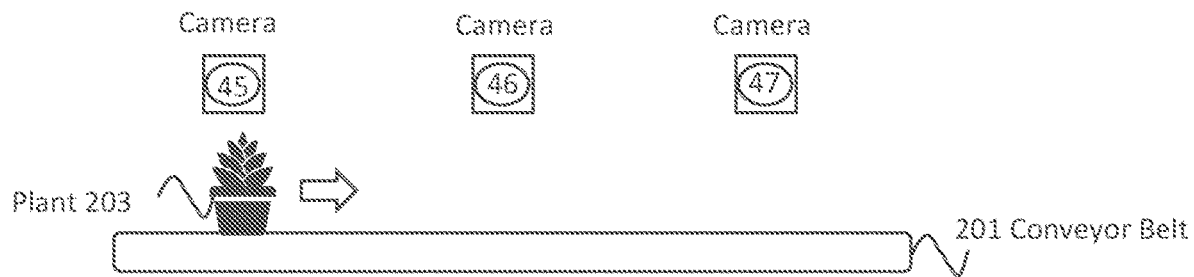
FIG. 9 shows a plant slowly moving on a conveyor belt while images are being captured.

FIG. 9 shows a plant 203 slowly moving on a conveyor belt 201 while images are being captured. In this situation, a fifth embodiment of the method of obtaining images of a plant may be beneficially used. In this fifth embodiment, a current position of the plant 203 with respect to cameras 45-47 is obtained and cameras 45-47 are controlled to capture the images at a moment which depends on the current position. As the plant 203 moves, the appropriate camera of cameras 45-47 is selected based on the current position so that the plant is in view of the camera.

This appropriate camera is controlled to capture an image when the plant 203 is determined or expected to be at an appropriate distance. The current position of a plant may be determined using image recognition or may be calculated based on the time when the plant was placed on the conveyor belt and the speed of the conveyor belt, for example. For example, there may be three or X times three pre-defined positions on the conveyor belt 201, one or X per camera, at which images are captured.

Figure 10:
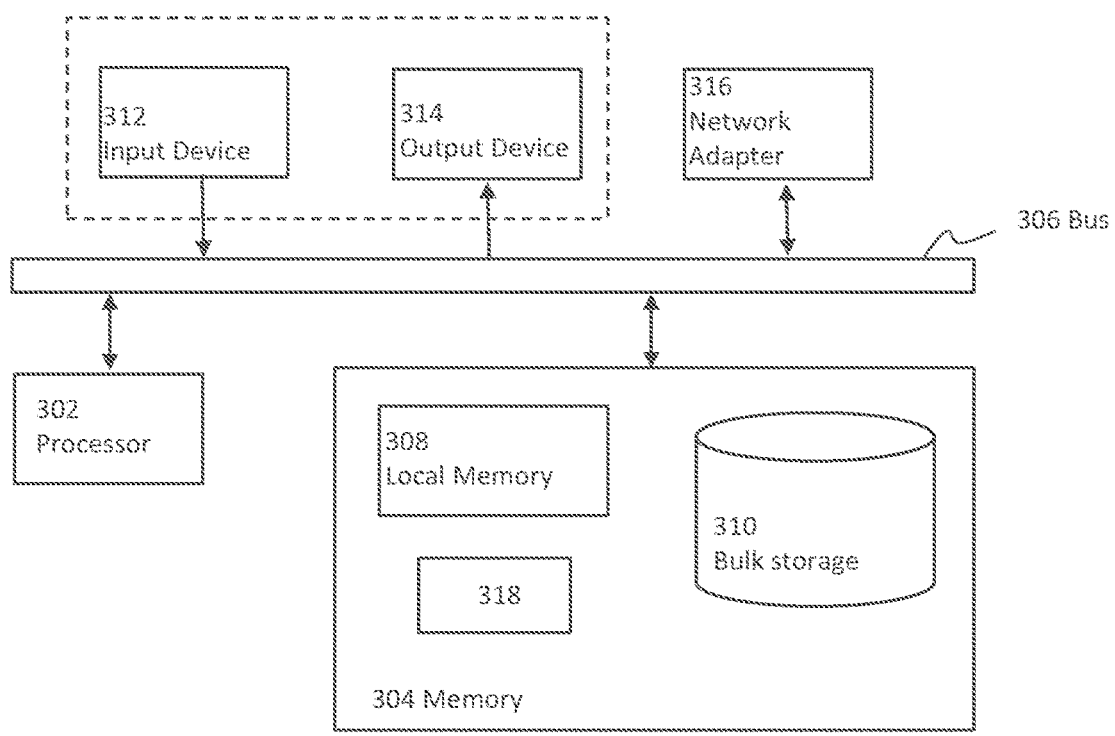
FIG. 10 is a block diagram of an exemplary data processing system for performing the method of the invention.

FIG. 10 depicts a block diagram illustrating an exemplary data processing system that may perform the method as described with reference to FIGS. 5 to 8

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for obtaining images of a plant, said system comprising:
    at least one input interface;
    at least one output interface; and
    at least one processor configured to:
        use said at least one input interface to obtain multiple images of a plant, each of said images being associated with a different capture moment,
        use said at least one input interface to receive user input, said user input comprising a camera or location identifier and information for identifying a grow protocol,
        store the camera or location identifier with the grow protocol,
        store a plurality of said multiple images of said plant with said grow protocol for growing said plant to augment said grow protocol with images of said plant at different growth stages in said grow protocol using the camera or location identifier associated with the grow protocol, said different growth stages corresponding to said different capture moments of said respective images,
        select said grow protocol separately from said plant,
        use said at least one output interface to render said plurality of images upon selection of said grow protocol, each of said plurality of images being rendered along with one or more desired and/or measured conditions of said growth stage including lighting conditions associated with said growth stage, said one or more desired and/or measured conditions being included in said grow protocol;
        use said at least one input interface to obtain a collection of images of a plurality of plants, said collection comprising said multiple images, select said plurality of images from said collection of images based on said camera or location identifiers, and store said plurality of images of said plant with said grow protocol.

2. The system as claimed in claim 1, wherein said at least one processor is configured to render said plurality of images as a video sequence, said images being in order of elapsed growth time in said video sequence.

3. The system as claimed in claim 1, wherein said at least one processor is configured to use said at least one input interface to receive user input comprising a user command for navigating through said growth stages and select one or more images to be rendered next from said plurality of images based on said user command.

4. The system as claimed in claim 1, wherein said one or more desired and/or measured conditions comprise lighting conditions and/or climate conditions and/or nutrition conditions.

5. The system as claimed in claim 1, wherein said at least one processor is configured to select a representative subset of said multiple obtained images as said plurality of images before storing said plurality of images of said plant with said grow protocol.

6. The system as claimed in claim 1, wherein said at least one processor is configured to:

use said at least one input interface to receive user input, said user input identifying a further plant and said grow protocol, obtain images of said identified further plant, determine differences between said obtained images and a plurality of images stored with said identified grow protocol, and use said at least one output interface to provide an alert if said differences are determined to exceed a predetermined threshold.

7. The system as claimed in claim 6, wherein said at least one processor is configured to use said at least one output interface to transmit a capturing schedule for capturing said images of said identified further plant to one or more cameras.

8. The system as claimed in claim 1, wherein said at least one processor is configured to use said at least one output interface to control one or more cameras to capture said multiple images at said different capture moments.

9. The system as claimed in claim 8, wherein said at least one processor is configured to use said at least one output interface to transmit a capturing schedule for capturing said multiple images to said one or more cameras.

10. The system as claimed in claim 8, wherein said at least one processor is configured to:

use said at least one input interface to obtain a current position of said plant with respect to said one or more cameras, and use said at least one output interface to control said one or more cameras to capture one of said images at a moment which depends on said current position.

11. The system as claimed in claim 10, wherein said one or more cameras comprise a plurality of cameras and said at least one processor is configured to select one of said plurality of cameras based on said current position.

12. A method of obtaining images of a plant, said method comprising:

obtaining multiple images of a plant, each of said images being associated with a different capture moment, receiving, via at least one input interface, user input, the user input comprising a camera or location identifier and information for identifying a grow protocol, storing the camera or location identifier with the grow protocol, storing a plurality of said multiple images of said plant with said grow protocol for growing said plant to augment said grow protocol with images of said plant at different growth stages in said grow protocol using the camera or location identifier associated with said grow protocol, said different growth stages corresponding to said different capture moments of said respective images;

selecting said grow protocol separately from said plant, rendering said plurality of images upon selection of said grow protocol, each of said plurality of images being rendered along with one or more desired and/or measured conditions of said growth stage including lighting conditions associated with said growth stage, and said one or more desired and/or measured conditions being included in said grow protocol;

obtaining, via said at least one input interface, a collection of images of a plurality of plants, said collection comprising said multiple images, selecting said plurality of images from said collection of images based on said camera or location identifiers, and storing said plurality of images of said plant with said grow protocol.

13. A non-transitory computer readable medium comprising instructions, the instructions, when run on a processor causes the processor to perform the method of claim 12.

14. A system for obtaining images of a plant, said system comprising:

at least one input interface;

at least one output interface; and at least one processor configured to:

use said at least one input interface to obtain multiple images of a plant, each of said images being associated with a different capture moment, store a plurality of said multiple images of said plant with a grow protocol for growing said plant to augment said grow protocol with images of said plant at different growth stages in said grow protocol, said different growth stages corresponding to said different capture moments of said respective images, use said at least one input interface to receive user input, said user input comprising a camera or location identifier and information for identifying a grow protocol, store said camera or location identifier with said grow protocol, use said at least one input interface to obtain a collection of images of a plurality of plants, said collection comprising said multiple images, select said plurality of images from said collection of images based on said camera or location identifiers, store said plurality of images of said plant with said grow protocol, select said grow protocol separately from said plant, and use said at least one output interface to render said plurality of images upon selection of said grow protocol, each of said plurality of images being rendered along with one or more desired and/or measured conditions of said growth stage, said one or more desired and/or measured conditions being included in said grow protocol.

15. The system as claimed in claim 14, wherein said at least one processor is configured to render said plurality of images as a video sequence, said images being in order of elapsed growth time in said video sequence.

16. The system as claimed in claim 14, wherein said at least one processor is configured to use said at least one input interface to receive user input comprising a user command for navigating through said growth stages and select one or more images to be rendered next from said plurality of images based on said user command.

17. The system as claimed in claim 14, wherein said at least one processor is configured to use said at least one output interface to control one or more cameras to capture said multiple images at said different capture moments.

18. The system as claimed in claim 17, wherein said at least one processor is configured to use said at least one output interface to transmit a capturing schedule for capturing said multiple images to said one or more cameras.

19. The system as claimed in claim 17, wherein said at least one processor is configured to:
- use said at least one input interface to obtain a current position of said plant with respect to said one or more cameras, and
- use said at least one output interface to control said one or more cameras to capture one of said images at a moment which depends on said current position.

* * * * *